United States Patent
Caglieris et al.

(10) Patent No.: US 11,815,418 B2
(45) Date of Patent: Nov. 14, 2023

(54) STRESS DETECTION SYSTEM IN FLEXIBLE TWO-DIMENSIONAL STRUCTURE

(71) Applicant: KOYRE S.r.l., Milan (IT)

(72) Inventors: Marco Caglieris, Segrate (IT); Alberto Fusco, Milan (IT); Luca Formentini, Milan (IT); Mirko Bargolini, Erba (IT); Alberto Cantamesse, Milan (IT)

(73) Assignee: KOYRE S.r.l., Milan (IT)

( * ) Notice: Subject to any disclaimer, the term of this patent is extended or adjusted under 35 U.S.C. 154(b) by 88 days.

(21) Appl. No.: 17/384,351

(22) Filed: Jul. 23, 2021

(65) Prior Publication Data
US 2022/0034737 A1 Feb. 3, 2022

(30) Foreign Application Priority Data
Jul. 28, 2020 (IT) .................. 102020000018331

(51) Int. Cl.
| | | |
|---|---|---|
| *G01L 5/10* | (2020.01) | |
| *B63B 79/10* | (2020.01) | |
| *D03D 1/00* | (2006.01) | |
| *G01L 1/22* | (2006.01) | |

(52) U.S. Cl.
CPC .............. *G01L 5/10* (2013.01); *B63B 79/10* (2020.01); *D03D 1/0088* (2013.01); *G01L 1/22* (2013.01); *D10B 2401/16* (2013.01)

(58) Field of Classification Search
CPC . G01L 1/18; G01L 1/2287–2293; G01L 1/22; B63B 79/10; G01B 5/207; G01B 7/18; D03D 1/0088
See application file for complete search history.

(56) References Cited

U.S. PATENT DOCUMENTS

| | | | | |
|---|---|---|---|---|
| 3,654,807 A | * | 4/1972 | Deskey ................. | B63B 49/00 73/180 |
| 4,038,867 A | * | 8/1977 | Andrews ................ | G01L 5/101 338/6 |
| 4,729,377 A | | 3/1988 | Granek et al. | |
| 5,877,415 A | * | 3/1999 | Kruse ..................... | G01P 13/02 73/170.06 |

(Continued)

FOREIGN PATENT DOCUMENTS

| | | |
|---|---|---|
| EP | 1942799 A1 | 7/2008 |
| EP | 2645893 A1 | 10/2013 |

(Continued)

OTHER PUBLICATIONS

Italian Search Report for IT Applicatio No. IT202000018331 filed on Jul. 28, 2020, on behalf of Koyre S.r.l. Dated of Completion of Report: Apr. 6, 2021. 2 Pages.

*Primary Examiner* — Tran M. Tran
(74) *Attorney, Agent, or Firm* — Steinfl + Bruno LLP

(57) ABSTRACT

A stress detection system includes a flexible two-dimensional structure, at least one electrically conductive textile filament, and an apparatus for generating and detecting an electric signal. The filament extends over a predetermined length in a portion of the flexible structure and has at least two points rigidly constrained to the structure. The apparatus is connected to the ends of the filament. The deformability of the filament is substantially equal to or greater than the deformability of the portion of the structure to which the filament is constrained.

13 Claims, 3 Drawing Sheets

(56) References Cited

U.S. PATENT DOCUMENTS

| | | | | |
|---|---|---|---|---|
| 6,826,968 | B2 * | 12/2004 | Manaresi | G01L 1/146 73/862.626 |
| 7,415,935 | B2 * | 8/2008 | Witte | G01P 5/24 73/204.27 |
| 7,531,203 | B2 * | 5/2009 | Tao | C23C 14/12 427/255.6 |
| 7,536,906 | B2 * | 5/2009 | Burke | H02G 3/305 73/170.06 |
| 8,032,199 | B2 * | 10/2011 | Linti | A61B 5/02055 600/389 |
| 8,291,779 | B2 * | 10/2012 | Helmer | G01D 5/165 73/865.4 |
| 8,397,564 | B2 * | 3/2013 | Voisin | G01P 13/02 73/170.01 |
| 8,869,725 | B2 * | 10/2014 | Brummer | B63H 9/06 73/170.03 |
| 8,884,913 | B2 * | 11/2014 | Saynac | G06F 21/36 345/174 |
| 8,943,897 | B2 * | 2/2015 | Beauvais | A61B 5/447 73/777 |
| 9,234,305 | B2 * | 1/2016 | Pollet | D02G 3/404 |
| 9,322,121 | B2 * | 4/2016 | Dunne | G01B 7/18 |
| 9,327,813 | B2 * | 5/2016 | Dogliotti | B63H 9/067 |
| 9,378,864 | B1 | 6/2016 | Liu | H01L 23/5387 |
| 9,494,474 | B2 * | 11/2016 | Servati | A61B 5/1114 |
| 9,554,465 | B1 * | 1/2017 | Liu | H05K 1/03 |
| 9,816,799 | B2 * | 11/2017 | Keller | G01B 7/18 |
| 9,885,621 | B2 * | 2/2018 | Dunne | G01B 7/18 |
| 10,190,864 | B2 * | 1/2019 | Nakamura | G01B 7/18 |
| 10,260,975 | B2 * | 4/2019 | Bocciolone | G01P 13/02 |
| 10,274,384 | B2 * | 4/2019 | Dunne | D05B 97/12 |
| 10,338,755 | B2 * | 7/2019 | Podhajny | D03D 7/00 |
| 10,481,022 | B2 * | 11/2019 | Servati | G01L 1/2287 |
| 10,602,965 | B2 * | 3/2020 | Connor | G06F 3/011 |
| 10,663,360 | B2 * | 5/2020 | Ibrocevic | G01L 1/26 |
| 10,739,924 | B2 * | 8/2020 | Podhajny | D03D 15/00 |
| 10,753,021 | B2 * | 8/2020 | Nurkka | A61B 5/0806 |
| 10,760,892 | B2 * | 9/2020 | Kamakura | G01B 7/18 |
| 10,900,154 | B2 * | 1/2021 | Podhajny | F21V 19/0025 |
| 11,204,656 | B2 * | 12/2021 | Podhajny | G06F 3/044 |
| 11,215,516 | B2 * | 1/2022 | Obata | G01L 1/205 |
| 11,346,729 | B2 * | 5/2022 | Haick | G01L 1/2287 |
| 11,390,971 | B2 * | 7/2022 | Nurkka | A61B 5/6805 |
| 2007/0089800 | A1 * | 4/2007 | Sharma | D04B 1/14 600/389 |
| 2008/0091097 | A1 * | 4/2008 | Linti | A61B 5/282 600/389 |
| 2010/0140462 | A1 * | 6/2010 | Farrell | B63H 9/067 374/161 |
| 2010/0199901 | A1 * | 8/2010 | Kang | H05K 1/038 57/244 |
| 2013/0104786 | A1 | 5/2013 | Brummer | |
| 2015/0164420 | A1 * | 6/2015 | Huang | A61B 5/24 442/306 |
| 2015/0168238 | A1 * | 6/2015 | Raut | G01N 27/223 702/42 |
| 2017/0176167 | A1 | 6/2017 | Keller et al. | |
| 2018/0347081 | A1 * | 12/2018 | Kurahashi | D04B 1/18 |
| 2019/0039706 | A1 * | 2/2019 | Tapp | B63H 9/06 |
| 2021/0339466 | A1 * | 11/2021 | Chaffins | B29C 64/307 |
| 2022/0221355 | A1 * | 7/2022 | Fowler | G01B 7/18 |
| 2022/0316865 | A1 * | 10/2022 | Ohanian, III | G01D 5/35374 |

FOREIGN PATENT DOCUMENTS

| | | |
|---|---|---|
| EP | 2676203 A1 | 12/2013 |
| WO | 2007/040878 A1 | 4/2007 |
| WO | 2009/138213 A2 | 11/2009 |
| WO | 2012/073076 A1 | 6/2012 |
| WO | 2012/112335 A1 | 8/2012 |

* cited by examiner

STRESS DETECTION SYSTEM IN FLEXIBLE TWO-DIMENSIONAL STRUCTURE

CROSS-REFERENCE TO RELATED APPLICATIONS

The present application claims priority to Italian patent application No. 102020000018331 filed on Jul. 28, 2020, which is incorporated herein by reference in its entirety.

FIELD

The present disclosure relates to a stress detection system in a flexible two-dimensional structure. In particular, the present disclosure relates to a system which allows to directly detect the stresses applied to flexible two-dimensional structures, such as the sail of a boat during navigation, without substantially altering their static and dynamic characteristics of use.

BACKGROUND

Textile sensors are known in particular for use in clothing and for detecting medical data. For example, textile sensors are described in patents EP2676203, EP1942799, EP2645893, U.S. Pat. No. 4,729,377; such sensors substantially consist of a fabric having a layer of fabric or conductive filament and an electrical connector for the connection to a processing device, external to the fabric.

Textile sensors are available on the market in various materials and finishes; recognised sensor manufacturers are for example Plug&Wear Srl, Modespitze Plauen GmbH, Elmatrix GmbH, WEARIC (TEXIBLE GmbH).

Apparatuses are known for detecting physical quantities on the surface of flexible elements such as sails, parachutes and the like.

For example, one such apparatus is described in patent application WO2009138213 which describes a plurality of such independent sensor nodes connected to the flexible material to be monitored, which transmit wireless signals to at least one receiver. Depending on the sensor used in the sensor node, it is then possible to detect load distribution, acceleration, temperature, etc. over the area of the flexible material.

Patent application US2019/0039706 describes an apparatus comprising a sensor which detects whether the apparatus is in use or at rest, comprising a light sensor and one or more accelerometers for detecting the orientation and vibrations of the apparatus.

SUMMARY

One problem that has been observed is that if known sensors are used to detect stresses applied to flexible two-dimensional structures, the sensors themselves modify the structural and dynamic characteristics of the object to be measured, or the measurements are altered by the presence of connecting elements that are interposed between the object and the sensor.

Flexible two-dimensional structures are structures that extend in two dimensions in space, with the third dimension, or thickness, being instead negligible and/or substantially irrelevant for the purposes of stress and deformation distribution and for the purposes of resistance bending stresses.

In particular, in the case of boat sails, it has been observed that if external sensors are used to detect the stresses applied to the sail, they detect values that are altered by various factors, such as the frictions caused by transmission gears, pulleys and the like through which the sensor is connected to the sail, while, in the case of sensors applied to the sail itself, they modify the dynamic and aerodynamic characteristics of the sail, altering the measurements made and therefore generally leading to detections of limited reliability.

A problem ensues when trying to detect the mechanical stresses applied to flexible two-dimensional structures, such as a sail, directly during the use of the structure itself, without interfering with the characteristics of the structure and without interposing elements that could alter the behaviour thereof or the values detected.

This problem is solved by a flexible two-dimensional structure according to the present disclosure.

In a first aspect, a stress detection system in a flexible two-dimensional structure is provided, comprising: a flexible two-dimensional structure, at least one electrically conductive textile filament, extending over a predetermined length in a portion of the flexible structure and having at least two longitudinally spaced points rigidly constrained thereto and an apparatus for generating and detecting an electric signal, connected to the ends of said electrically conductive textile filament, wherein the deformability of the electrically conductive textile filament is substantially equal to or greater than that of the portion of the flexible two-dimensional structure to which it is constrained.

For the purpose of the present disclosure, deformability of the electrically conductive textile filament substantially equal to or greater than that of the portion of the flexible two-dimensional structure to which it is constrained means that the electrically conductive textile filament has an elastic modulus and dimension such that a portion of the flexible structure to which said textile filament is constrained exhibits deformations under stress and flexibility that differ to a substantially negligible extent from those of the same portion of the flexible structure without said textile filament.

Preferably, the electrically conductive textile filament is arranged on the flexible two-dimensional structure in a configuration having two substantially rectilinear parallel portions electrically connected to each other.

In one embodiment, the electrically conductive textile filament is arranged on the flexible two-dimensional structure in a U-shaped configuration.

The substantially rectilinear parallel portions of the textile filament comprise two free ends electrically connected to the electronic apparatus.

In one embodiment, the electrically conductive textile filament is inserted into a housing formed on the surface of the flexible structure.

In one embodiment, the electrically conductive textile filament is constrained to the flexible structure over its entire length.

In a configuration of such embodiment, the flexible structure comprises at least two layers constrained to each other and the electrically conductive textile filament is inserted between said layers.

In one embodiment, the flexible structure is the sail of a boat.

Preferably, in this embodiment, the electrically conductive textile filament is arranged with the relative parallel portions oriented along the direction designed for greater deformation of the sail in use.

Preferably, in this embodiment, the electrically conductive textile filament is arranged in the area designed for maximum load of the sail in use.

Alternatively, in this embodiment, the electrically conductive textile filament is arranged in the area designed for greater deformability of the sail in use.

In one embodiment, the flexible structure is the mainsail of a boat and at least one electrically conductive textile filament is placed in proximity to the leech of the mainsail, parallel thereto.

In one embodiment, the flexible structure is the mainsail of a boat and the electrically conductive textile filament is placed in proximity to the luff of the mainsail and is at least 80% of the length of the luff.

In one aspect, the apparatus for generating and detecting an electrical signal comprises at least one microprocessor connected to the electrically conductive textile filament and a wireless transmitter.

The microprocessor comprises an element for measuring the impedance of the electrically conductive textile filament.

BRIEF DESCRIPTION OF THE DRAWINGS

More details can be found in the following description of an embodiment example, with reference to the accompanying figures.

DETAILED DESCRIPTION

Figure 1:
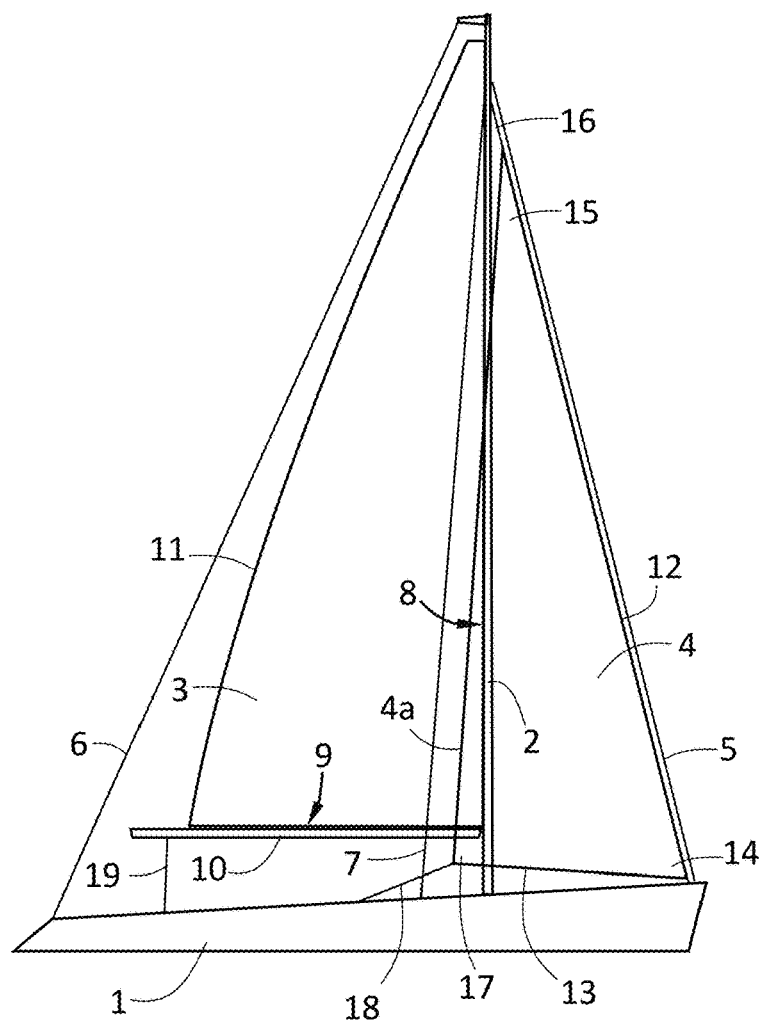
FIG. 1 shows a schematic view of a sailing boat.
Figure 2:
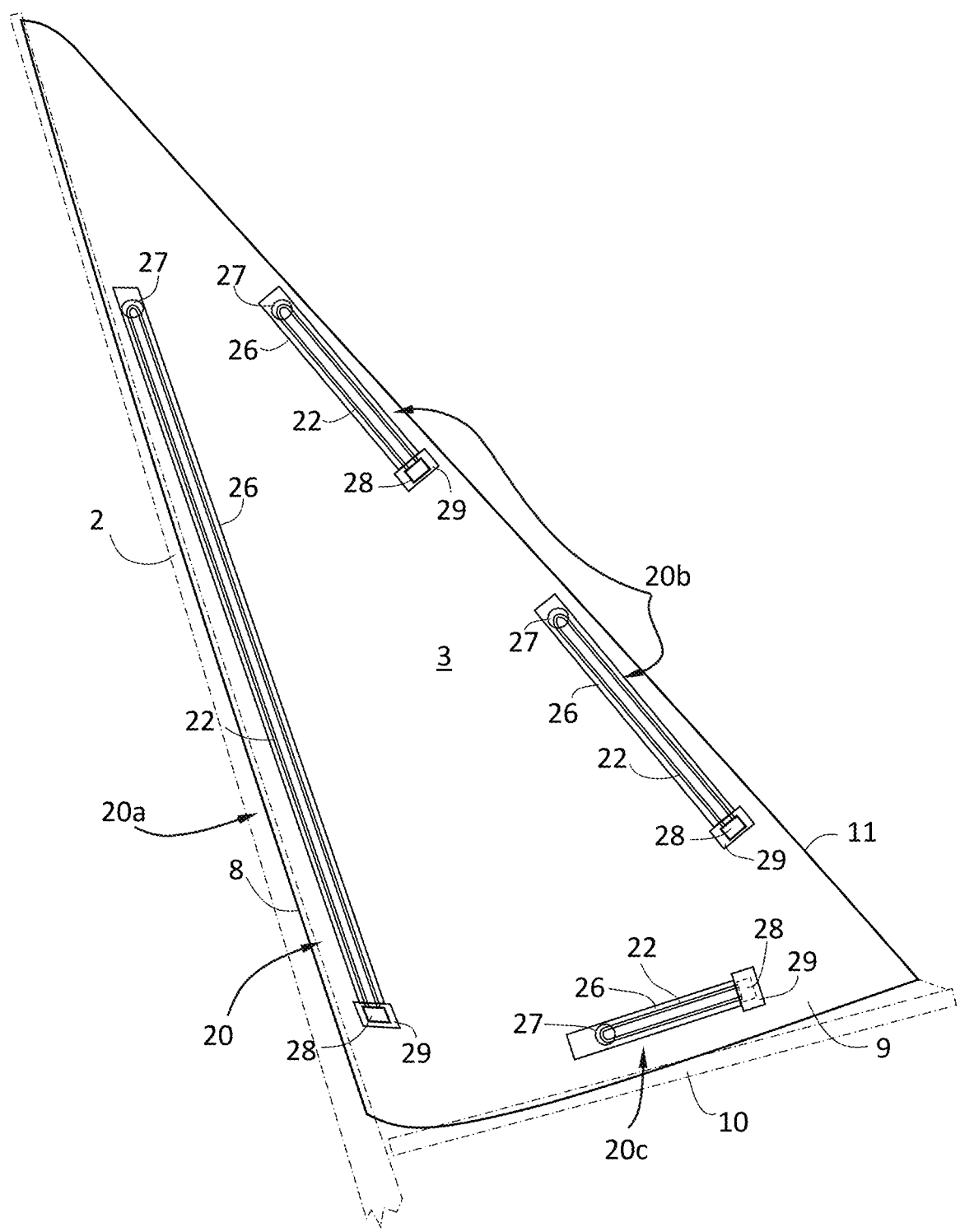
FIG. 2 shows a sail of a boat, equipped with several detection devices.

As shown in FIGS. 1 and 2, a sailing boat typically comprises a hull 1, a mast 2 and one or more sails, for example a mainsail 3 and a jib or genoa 4.

The stability of the mast is generally guaranteed by several cables connected to the hull of the boat, for example a forestay 5, a backstay 6 and more shrouds 7.

Typically, the mainsail 3 comprises a luff 8, adapted to be fitted into a corresponding guide of the mast 2, directly or through suitable carriages, not illustrated, a base 9 connected to the boom 10 of the boat, and a leech 11, i.e. the trailing edge of the wind flowing over the sail parallel to the sea surface. A suitable tension is applied to the luff 8 through a respective rope or halyard, not illustrated; by adjusting said tension it is possible to modify the aerodynamic behaviour of the sail in relation to the different wind conditions encountered by the boat.

The jib 4, in turn, comprises a bolt rope 12, free or connected to the forestay 5 by means of hooks or fitted in a channel integral with the forestay, a respective leech 4a and a lower edge or foot 13. The lower front end of the jib, or tack 14, is generally connected to the hull while the upper end of the jib, or jib top 15, is connected to a halyard 16, which by means of a respective return pulley located in proximity to the upper end of the mast, makes it possible to apply a suitable tension to the bolt rope.

A jib sheet 18, through which the shape and tension of the jib under the effect of the wind is adjusted, is connected to the connection point 17 between the leech 4a of the jib and the foot 13, known as the clew.

Similarly, a mainsheet 19 connected to the boom 10 allows the mainsail orientation adjustments required during sailing to be made.

The tensions applied to the shrouds, the forestay, the backstay through appropriate tensioning members, together with the tensions applied to the halyards and the sheets during sailing, determine the curvature of the mast, its rigidity and the conformation of the sails under the stresses applied to the sails by the wind during sailing.

The result of the adjustments made on the mast and on the sails is a state of tension in the sails themselves, which in some areas are provided with appropriate reinforcements to support the corresponding stresses, for example made by overlapping several layers of material connected together, based on the design characteristics of the sail itself.

For the purpose of accurately detecting the stresses that are caused in the sail during sailing, both for an effective design of the sail structure and for best handling the boat and to avoid breakage, one or more detection devices 20 are applied to the sail, for example to the mainsail 3 shown in FIG. 2 (FIG. 2 shows four of them, in various arrangements).

Figure 3:
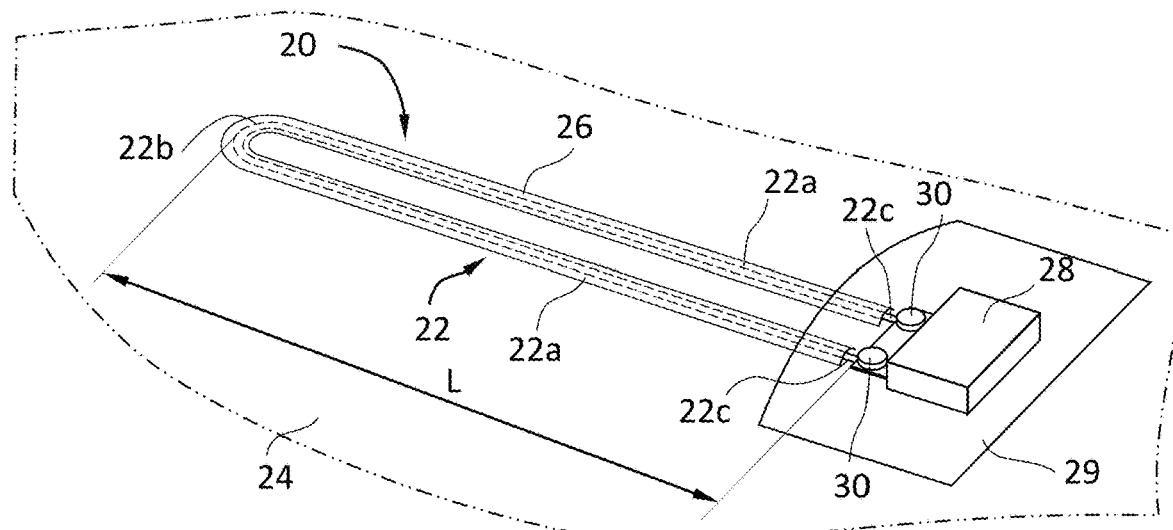
FIG. 3 shows an enlarged view of a detection device applied to a sail.

As shown in FIG. 3, a detection device 20 comprises a sensor comprising an electrically conductive textile filament 22 (hereinafter referred to for the sake of brevity as "textile sensor"), adapted to measure the elongation (elastic or plastic deformation) of the surface 24 of the sail on which it is applied and an electronic apparatus 28 for reading the electrical signal generated by the textile sensor 22, processing it, recording and transmitting the data relating to the measurement.

The electronic apparatus 28 measures the impedance as a variable electrical current passes along the textile sensor 22. The relationship between the impedance of the electrical circuit and the characteristics (such as length and cross-sectional diameter) of the component of the electrical circuit constituted by the textile sensor 22 makes it possible to associate the variation in impedance with the variation in length of the textile sensor itself.

By appropriately positioning the textile sensor 22 on the surface of the sail, it is then possible to measure the deformation component (elongation) along the direction of the sensor.

The textile sensor 22, depending on the size of the sail surface and the weight of the material of which it is composed, consists of a thread-like element or a strip or tape, with a constant width of a few millimeters (preferably from 3 to 10 mm, although smaller or larger widths may be used, in relation to particular conditions of use), with a constant thickness of the order of a millimeter and with a length that is defined as a function of the sensitivity of the sensor in relation to the flexible structure (e. g. sail) to which it is affixed and to the elongation characteristics of the relative material (from a few decimeters to a few meters).

The textile sensor 22, made from cotton, polyester, nylon, Kevlar®, or polyethylene, comprises a portion made from a filament of electrically conductive material, such as Poly(3, 4-ethylenedioxythiophene)-poly(styrenesulfonate), marketed by Heraeus under the name Cevios™ PEDOT:PSS.

The textile sensor 22 can be glued or integrated into the structure of the sail (for example by inserting it between the different layers of fabric in a composite material), or it can be affixed to the sail (for example a mainsail 3 or a jib or genoa 4) inserted inside a housing 26, preferably made to the size of the tape forming the sensor, inside which the textile sensor 22 can be free to slide over a portion of its length.

The housing 26 can be obtained in the structure of the sail, in the form of a channel obtained within the layers of the composite from which the sail is made, or as a pocket glued or sewn onto the surface of the sail.

The housing 26 has the function of maintaining a stable positioning of the sensor 22 with respect to the surface on which it is affixed and of protecting the sensor itself from external mechanical stresses (shocks, rubbing, etc.) and from chemical and atmospheric agents (in particular humidity, which could compromise the correct passage of the electrical signal).

The housing 26 is preferably made of materials and thicknesses such that they do not substantially interfere with the dynamic characteristics of the sail whose deformation is measured.

In one embodiment, illustrated in FIG. 3, the textile sensor 22 is placed according to a "U" path, with two parallel sections 22a and a curved portion 22b, so as to have the two ends 22c positioned a few centimeters apart from each other; this makes it possible to easily close the electrical circuit of the sensor by connecting the two ends 22c to the electronic apparatus 28.

The "U" positioning doubles the sensitivity of the sensor with respect to elongation, since it doubles the length of the filament with respect to the length of application of the sensor on the surface of the sail being measured.

Figure 4:
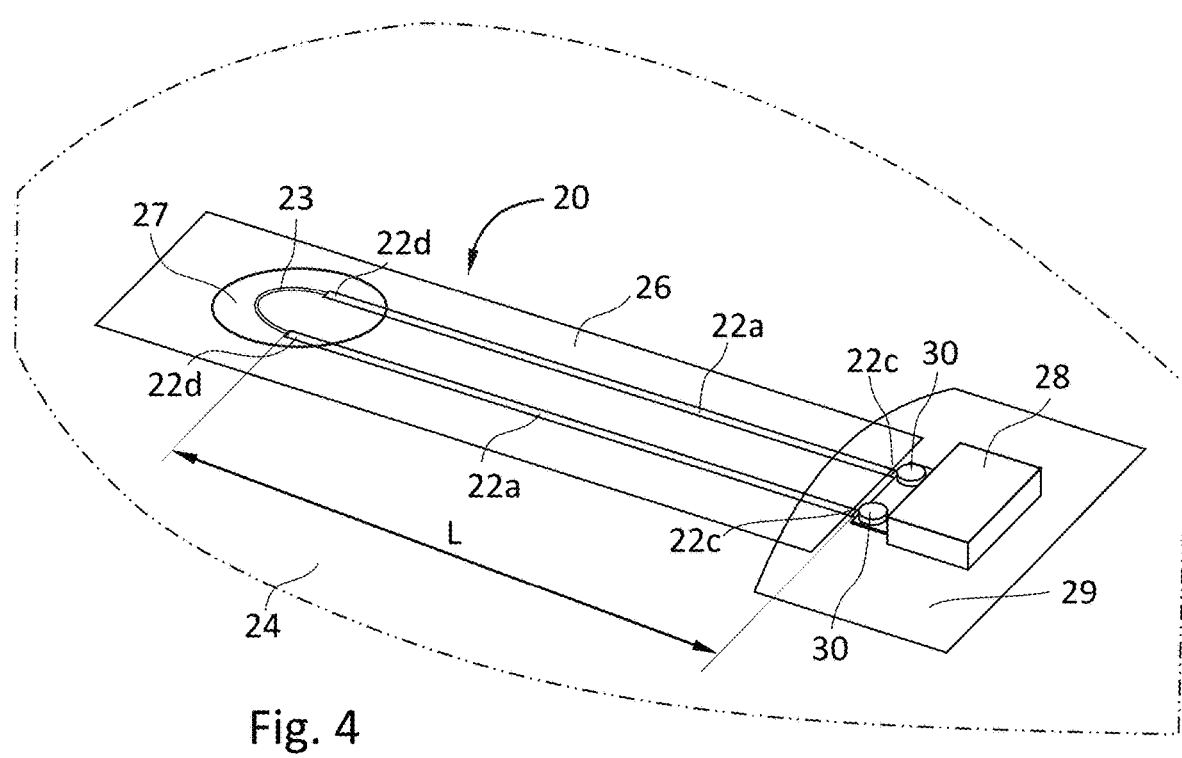
FIG. 4 shows an enlarged view of a detection device applied to a sail in an alternative embodiment.

In another configuration, illustrated in FIG. 4, the sensor 22 is made of two substantially rectilinear portions 22a arranged in parallel on a surface of the sail (or mirrored on the two faces of the sail), with two free ends 22c connected to the electronic apparatus 28 and two second free ends 22d, opposite the free ends 22c, connected to each other by a wire/conductor bridge 23. This arrangement may, in some applications, make it easier to place the sensor on the two-dimensional surface.

In both solutions, the textile sensor extends in two parallel portions 22a, comprised between the two free ends 22c, connected to the electronic apparatus 28, and the curved portion 22b or the second free ends 22d, with an overall length that is defined according to the length required by the sensitivity needed for the voltage measurements of the specific material/sail.

The free ends 22c of the sensor and at least the intermediate point of the curved portion 22b of the textile sensor or the second free ends 22d, in relation to the chosen configuration, are made integral with the sail, so as to effectively transmit to the sensor the deformations of the sail in the area where the sensor is applied. For this purpose, the free ends 22c and the part of the sensor at the curved portion 22b or at the second free ends 22d may be made integral with the surface of the sail by sewing, gluing, stapling or the like, depending on the construction material of the sail. For example, in the case that the textile sensor is made in a U-shaped conformation, the constraint of the curved portion 22b can be achieved by also making the housing 26 in a U shape, as illustrated in FIG. 3. Alternatively, or additionally, the curved portion 22b or the second free ends 22d can be constrained to the sail by a patch 27, glued to the surface of the sail, as shown in FIG. 4.

The length L of the textile sensor 22, understood as the distance between the free ends of the textile sensor made integral with the sail, as illustrated in FIGS. 3 and 4, determines the sensitivity of the sensor. Preferably, the minimum length L of the sensor is approximately 1 meter, so that the necessary sensitivity can be guaranteed depending on the deformation characteristics of the sail (mainsail). This value is suitable for the sail size range of a 42-foot (12.8 meters) boat or similar. In the case of sensors installed on longer boats, such as maxi-yachts (70 feet-21 meters—or more), more sensitive sensors (which tend to be longer) may be useful, as the sail weight is higher and the sail deforms less with the same linear distance.

Different values for the length of the textile sensor can be adopted in relation to the type of sail used, its dimensions and materials and the type of measurement desired.

With regard to the preferred maximum length of the textile sensor, it is preferably correlated with its placement and with the type of measurement desired.

For example, if it is wished to measure the tension applied to the mainsail luff, as illustrated in FIG. 2 with the reference 20a, in order to measure the elongation along the entire sail component and then check its behaviour in relation to the design parameters and the relationship between the elongation measured and the shape of the mainsail during sailing (how the curvature moves) and the relative indications on the performance of the sail/boat, the maximum length L of the sensor can reach up to a value of approximately 80% with respect to the length of the luff itself.

If it is wished to measure the tensions along the leech of the sail, it may be preferable to perform a local measurement, in order to verify how the surface of the sail behaves in proximity to the trailing edge in different points; several sensors can be positioned to measure the distribution of the tension state along the leech, which have a length L sufficient to guarantee the correct measurement sensitivity (e.g. 1.0-1.5 meters), aligned in series in proximity to the leech, as shown in FIG. 2 with the reference 20b.

In this case, the size of the sail does not affect the length of the sensor (except for its minimum length in relation to the sensitivity of the sensor compared to the sail weight), but the number of sensors that one decides to apply along the leech. Also in this case, the measurements have the dual function of verifying the real behaviour of the sail with respect to the design parameters and the performance of the sail.

Similarly, as illustrated in FIG. 2, one or more sensors 20c may be used in proximity to the base 9 of the mainsail 3.

Such placements are made possible by the fact that the flexibility of the sensors, and their weight and footprint, are such that they do not substantially alter the behaviour of the sail.

The textile sensor 22 and the housing 26 are made with materials and thickness such that they do not significantly alter the dynamic behaviour of the sail whose deformation is to be measured.

For example, some of the materials which can be used to make a sail are listed herebelow:

| Material | Elastic module (Mpa) |
| --- | --- |
| Polyester (Mylar ®) | 3800-4200 |
| High Density Polyethylene (Dyneema ®) | 100000 |
| Aramid (Kevlar ® 49) | 130000 |
| Carbon | 250000-500000, | while a conductive filament made of a silver coated polyamide fibre has elastic module of the order of about 2000 Mpa.

Assuming that the sail fabric and the conductive filament attached thereto have the same thickness, the contribution of a sensor filament to the overall deformability of a sail made of polyester (i.e. the material having lower module) would be lower than 50%; in case of a sensor attached to a sail made with higher rigidity materials, the contribution of a sensor filament to the overall sail deformability would be less than 2%, Moreover, as the sails are usually made with thickness higher than the size of the conductive filament, the contribution of the textile sensor to the overall deformability is accordingly lower (and substantially negligible to the purpose of the measurements to be made).

For example, a textile sensor 22 can be made by a Poly(3,4-ethylenedioxythiophene)-poly(styrenesulfonate) filament having 0.1 mm thickness, inserted in a housing 26 made of a 0.1 mm thickness nylon fabric. Such sensor, attached to a sail made of a 0.45 mm laminate (a composite made of a polyester—Mylar®—film, carbon fibre and polyester—Mylar®—film) causes a local deformability change lower than 5%, which is negligible to the purpose of the measurements to be made.

In case of sails made of different materials and weights (and corresponding thickness), the materials and thickness to be used for the sensor and its housing can be suitably adjusted to preserve the characteristics of the measurements to be made.

Depending on the arrangement of the sensors 20 on the surface of the sail, important information can be gathered both on the aspects linked to the sail design and on the sail/boat performance; for example, while sailing, complete information can be gathered for the purpose of the adjustment of the shape of the leech (twist) in relation to wind intensity and different sailing speeds, possibly by integrating the information obtained with the data obtained from other instruments (for example wind speed and direction, boat speed and the like).

Similarly, one or more textile sensors can be applied to other types of sails, such as jib, genoa, spinnaker and the like; the position and the orientation of the placement of the sensors on these sails can be selected based on the characteristics of each sail and the specific measurement requirements.

The free ends 22c of the textile sensor are connected to an electronic apparatus 28 by means of appropriate connectors 30 or another method that guarantees the correct electrical connection.

In order to protect the connectors 30 and the electronic apparatus 28 from external mechanical stresses (shocks, rubbing, etc.) and from chemical, atmospheric agents (mainly humidity that would compromise the correct passage of the electrical signal), the electronic apparatus 28 can be glued or sewn to the sail, or inserted in a pocket 29 applied to the sail or made inside the composite forming the sail itself. Preferably, the pocket 29 is openable and allows the apparatus to be detached from the textile sensors for maintenance, recharging or replacement thereof.

In the examples illustrated, the free ends 22c of the textile sensor are directly connected to the electronic apparatus 28. If it is wished to place the electronic apparatus 28 in a different position from that chosen for the textile sensor 22, for example for a greater protection thereof from the weather or to prevent the shape and the mass of the electronic apparatus 28, albeit still limited, from unacceptably altering the performance of the sail, the electronic apparatus 28 may be placed at a distance, for example in the proximity to a clew of the sail; in such a case, and the free ends 22c of the sensor are connected to the electronic apparatus 28 by means of conductive wires, preferably loosely connected to the sail, such that the stresses arising from the loads applied to the sail itself do not alter its impedance by affecting the measurement detected by the textile sensor 22.

Figure 5:
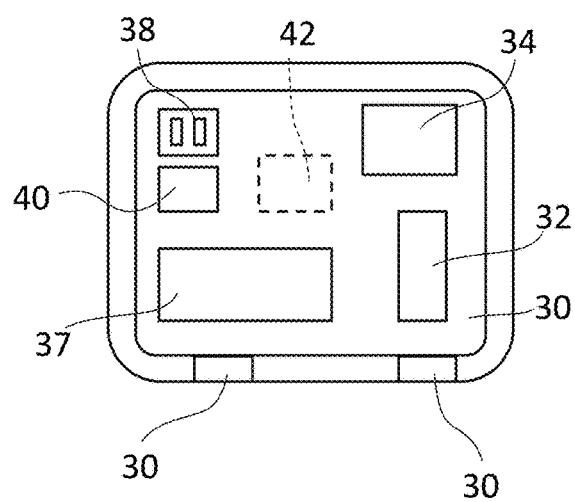
FIG. 5 shows a schematic plan view of the electronic detection apparatus.
Figure 6:
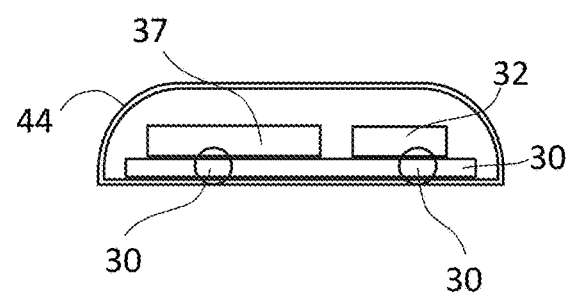
FIG. 6 shows a schematic sectional view of the electronic apparatus in FIG. 5.

As shown in FIGS. 5 and 6, the electronic apparatus 28 comprises a printed circuit board or PCB 33 carrying a microchip 32 adapted to collect and read the characteristic electrical quantity of the sensor (impedance) influenced by the applied load, and which preferably contains the memory for storing the data; the connectors 30 for the connection to the ends of the textile sensor 22, a data transmitter 34, for example by means of Bluetooth technology, a power supply battery 37, one or more accelerometers 38, a tilt sensor 40 and any other sensors 42 are connected to the microchip 32.

A protective casing 44, e.g. made of plastic, rubber, silicone resin or similar, ensures the mechanical protection and impermeability of the apparatus.

The impedance signal detected at the ends 22c of the textile sensor 22, suitably interpreted by the electronic apparatus, provides a measurement of the elongation undergone by the textile sensor 22, from which the deformations of the sail surface along the direction of the two linear sections of the sensor are deduced and measured.

The electronic apparatus 28 collects the electrical signals coming from the textile sensor 22 and translates them into data which it transmits to a gateway installed on the boat, for example by Bluetooth, or other communication technology, depending on the field of application. Through the gateway installed on the boat, the data are then processed for later use and sent to a data collection and analysis unit (central PC), for example via an Ethernet wired connection. From this, data can be sent to the end user on different display systems (e.g. smartphone, PC, tablet, or other tools).

The same smartphone connected to the apparatus 28 can act as a gateway and directly export the data on a web platform for further processing.

The measurement of the elongation of the textile sensor 22 and therefore of the deformation of the sail along the positioning direction allows the behaviour of the sail to be deduced in relation to the design parameters of the sail itself (material resistance, shape, loads, wear, deterioration). The comparison between the measurements taken by means of the sensor-apparatus system and the theoretical design values of the sail allows the real behaviour of the sail to be deduced with respect to the various stresses and conditions of use, highlighting any deviation from the design model. The textile sensor 22 can be positioned in different points on the surface of the sail and with different orientations with respect to the geometry of the sail in relation to the need to monitor the mechanical characteristics of elongation/deformation of the sail in the different conditions of use.

For example, one or more textile sensors 22 detect the deformations of the fabric and enable to obtain the local tensions; by integrating the data coming from the sensors it is then possible to determine the shape of the sail in use, in the various conditions of wind and adjustment, with the possibility of comparing the real situation with that of the design: these data are useful for understanding the functioning of the sail and evaluating its performance.

Knowledge of the deviation of the sail behaviour from the design model can:
a. provide guidance for improving the design of the sail;
b. determine associations between the performance of the sail and the stresses/deformations to which it is subjected during use;
c. detect signs of material deterioration over time in relation to the variations in its mechanical characteristics;
d. identify an incorrect use of the sail in relation to the wind-field-weather conditions of use.

Based on the methodology of use of the elongation measurements carried out, it is therefore possible to obtain two kinds of measurements:

1) Measurement of the deformation/stress of the fabric/laminate/weave of the sail in relation to the conditions of use and comparison with the sail design parameters (material weight, deformation/stress of the area of interest where the sensor is placed).

To this end, the sensor can be placed either in proximity to the luff, in the area of the sail luff in the mast, as indicated in FIG. 2 with the reference 20a, where the loads applied are greater, or in proximity to the leech, as indicated with the reference 20b, where generally the material of the sail is less thick and the dynamic stresses during navigation are greater. In this case, the main objective of the measurement is to verify and improve the design parameters of the sail.

2) Measurement of fabric/laminate/weave elongation of the sail at the luff in relation to sail halyard tension and conditions of use.

In this second case, the main objective is to measure an objective parameter that influences the shape of the sail in the different conditions of use and which can therefore be related to the performance of the sail and the sailing boat.

An additional textile sensor (not illustrated), differently positioned on the surface of the sail that allows detecting parameters other than tension/deformation (e.g. temperature of the sail surface, pressure exerted by the wind on the sail surface) can be connected in parallel to the electronic apparatus 28 (by duplicating the connectors for the connection of the external sensor to the apparatus).

Other types of sensors 42 can be inserted in the electronic apparatus 28, such as GPS position sensors, orientation sensors (compass), brightness sensors, 3-axis acceleration sensors, temperature, humidity and pressure sensors; these sensors are available on the market. The purpose of these sensors is to integrate the measurements made by the main sensor with the measurement of other parameters relating to the conditions of use of the sail.

For example, the measurement of the vibrations by means of the accelerometers 38 that are present in the electronic apparatus 28 makes it possible to detect situations of stress and fatigue wear of the fabrics, and in combination with the data provided by a brightness sensor it makes it possible to accurately determine the state of ageing of the sail.

Although the present disclosure has been exemplified with application to the sails of a boat, its teachings also find application in other cases in which similar problems arise, in particular for the direct detection of stresses and deformations in flexible structures, such as sheets, membranes and the like, without the sensor element being able to alter the static and dynamic characteristics of the structures themselves.

The invention claimed is:

1. A stress detection system in a flexible two-dimensional structure, comprising:
   i) a flexible two-dimensional structure having at least one deformable direction,
   ii) a sensor comprising two electrically conductive textile parallel filament portions electrically connected in series to each other, each of the two electrically conductive textile parallel filament portions having a filament end, wherein:
      the two electrically conductive textile parallel filament portions are constrained to a portion of the flexible two-dimensional structure with the two electrically conductive textile parallel filament portions laying in a direction parallel to said at least one deformable direction of the flexible two-dimensional structure;
      the filament ends are constrained to the flexible two-dimensional structure; and
      the two electrically conductive textile parallel filament portions are deformable in a direction parallel to said at least one deformable direction of the flexible two-dimensional structure; and
   iii) an apparatus comprising a printed circuit board and a microprocessor for generating and detecting an electric signal, the apparatus being connected to the filament ends,
   wherein the two electrically conductive textile parallel filament portions have a deformability substantially equal to or greater than a deformability of the portion of the flexible two-dimensional structure to which the two electrically conductive textile parallel filament portions are constrained.

2. The stress detection system according to claim 1, wherein the two electrically conductive textile parallel filament portions are arranged in a U-shaped configuration.

3. The stress detection system according to claim 1, wherein the two electrically conductive textile parallel filament portions are located in a housing formed on a surface of the flexible two-dimensional structure.

4. The stress detection system according to claim 3, wherein the two electrically conductive textile parallel filament portions are constrained to the flexible two-dimensional structure over an entire length of the two electrically conductive textile parallel filament portions.

5. The stress detection system according to claim 4, wherein
   the flexible two-dimensional structure comprises at least two layers constrained to each other and
   the two electrically conductive textile parallel filament portions are inserted between said at least two layers.

6. The stress detection system according to claim 1, wherein the flexible two-dimensional structure is a sail of a boat.

7. The stress detection system according to claim 6, wherein the two electrically conductive textile parallel filament portions are arranged in an area configured for maximum load of the sail in use.

8. The stress detection system according to claim 6, wherein the two electrically conductive textile parallel filament portions are arranged in an area configured for maximum deformability of the sail in use.

9. The stress detection system according to claim 6, wherein the sail is a mainsail having a leech, and the two electrically conductive textile parallel filament portions are placed in proximity and parallel to the leech.

10. The stress detection system according to claim 6, wherein the sail is a mainsail having a luff, and the two electrically conductive textile parallel filament portions:
    are placed in proximity of the luff,
    are parallel to the luff, and
    each have a length equal to at least 80% of a luff length.

11. The stress detection system according to claim 1, wherein the apparatus for generating and detecting an electrical signal comprises a wireless transmitter.

12. The stress detection system according to claim 11, wherein the apparatus for generating and detecting an electrical signal is configured to measure impedance of the two electrically conductive textile parallel filament portions.

13. A method for detecting stress in a flexible two-dimensional structure, comprising:
    rigidly constraining two longitudinally spaced points of at least one electrically conductive textile filament to the flexible two-dimensional structure;
    causing a variable electrical current to pass along the at least one electrically conductive textile filament;

performing at least two impedance measurements of the at least one electrically conductive textile filament in respective at least two different stretching conditions of the flexible two-dimensional structure;

based on a variation in impedance of the at least one electrically conductive textile filament in said at least two different stretching conditions, determining a corresponding variation in length of the at least one electrically conductive textile filament; and based on the variation in length of the at least one electrically conductive textile filament, determining a corresponding variation in shape of the flexible two-dimensional structure.

\* \* \* \* \*